United States Patent [19]
Davies et al.

[11] Patent Number: 5,255,287
[45] Date of Patent: Oct. 19, 1993

[54] TRANSCEIVER APPARATUS AND METHODS

[75] Inventors: David C. Davies, Chelmsford; Donald G. Vonada, Stow; Robert A. Curtis, Hudson, all of Mass.

[73] Assignee: Digital Equipment Corporation, Maynard, Mass.

[21] Appl. No.: 723,085

[22] Filed: Jun. 28, 1991

[51] Int. Cl.$^5$ .......................................... H04L 25/34
[52] U.S. Cl. ...................................... 375/17; 307/465
[58] Field of Search ............................ 375/17, 18, 11; 307/412, 16, 465; 333/18, 28 R; 341/56, 57

[56] References Cited

U.S. PATENT DOCUMENTS

| | | | |
|---|---|---|---|
| 3,456,206 | 7/1969 | Kwartiroff et al. | 330/32 |
| 3,465,101 | 9/1976 | Christian et al. | 178/68 |
| 3,733,550 | 5/1976 | Tazaki et al. | 325/38 A |
| 3,980,826 | 9/1976 | Widmer | 178/68 |
| 3,993,953 | 11/1976 | Lender et al. | 325/38 A |
| 4,083,010 | 4/1978 | Looschen | 325/321 |
| 4,516,248 | 5/1985 | Barclay et al. | 375/76 |
| 4,553,102 | 11/1985 | Yoshida | 329/133 |
| 4,606,046 | 8/1986 | Ludwick | 375/17 |
| 4,627,073 | 12/1986 | Shepperd et al. | 375/20 |
| 4,630,286 | 12/1986 | Betts | 375/39 |
| 4,637,036 | 1/1987 | Kobari | 375/76 |
| 4,748,346 | 5/1988 | Emori | 307/270 |
| 4,818,995 | 4/1989 | Takahashi et al. | 341/94 |
| 4,823,360 | 4/1989 | Tremblay et al. | 375/4 |
| 4,862,485 | 8/1989 | Guinea et al. | 375/120 |
| 4,945,258 | 7/1990 | Picard et al. | 307/270 |
| 5,119,402 | 6/1992 | Ginzburg et al. | 375/18 |

OTHER PUBLICATIONS

"A 100Mb/s Clock Recovery and Data Retiming Chip Set" by Kolluri et al.
Product Specification for NE/SA5068 Circuit, Philips Components, 1989.
Product Specification for NE568A Phase-Locked Loop, Signetics Co., 1988.
"Run-Length-Limited Variants of Duobinary and Modified Duobinary" by Kim et al., IEEE Transactions on Communications, vol. COM-35, No. 2, Feb. 1987, pp. 142–150.
"New Runlength-Limited and DC-Free Line Code of Minimum Bandwidth" by Kim et al., Electronics Letters, vol. 18, No. 24, Nov. 25, 1982, pp. 1040–1041.
"A Survey of Coding Schemes for Transmission or Recording of Digital Data" by Kobayashi, IEEE Transactions on Communication Technology, vol. COM-19, No. 6, Dec. 1971, pp. 1087–1100.
"Correlative Data Transmission with Coherent Recovery Using Absolute Reference" by Lender, IEEE Transactions on Communication Technology, vol. COM-16, No. 1, Feb. 1986, pp. 108–115.
"Sequence-State Coding for Digital Transmission" by Franaszek, The Bell System Technical Journal, Nov. 1967, pp. 143–157.
"Generalization of a Technique for Binary Data Communication" by Kretzmer, IEEE Transactions on Communication Technology, Feb. 1966, pp. 67–68.
"Digital Communications: Microwave Applications" by Feher, Chapter 7, p. 150.

Primary Examiner—Curtis Kuntz
Assistant Examiner—Tesfaldet Bocure
Attorney, Agent, or Firm—Albert P. Cefalo; Ronald C. Hudgens; James F. Thompson

[57] ABSTRACT

Transceiver apparatus includes a transmitter circuit constructed with either emitter coupled logic (ECL) circuitry or programmable array logic circuitry, and a receiver circuit constructed with ECL circuitry. The transmitter circuit encodes a binary data signal received for transmission as a three-level modified duobinary encoded data signal and the receiver circuit decodes the received three-level encoded data signal to provide a binary data signal corresponding to the data signal received at the transmitter circuit for transmission. Both the transmitter and receiver circuits include features enabling transmitting and receiving high data-rate data signals.

44 Claims, 6 Drawing Sheets

TRANSCEIVER APPARATUS AND METHODS

BACKGROUND OF THE INVENTION

The present invention relates to digital information transmission systems and, more particularly, to transceiver apparatus and methods for transmitting and receiving high data-rate data signals.

A continuing trend in the development of digital information transmission systems is to increase the effective bandwidth of transmission media by sending data at a faster data rate. Such transmission media include two-conductor twisted pair unshielded cable, such as utilized in telecommunication circuits but can also include other media types such as flat, twin-axial and coaxial cables. As used herein, a high data-rate for transmitting data signals is at least 60 Mbit/s.

It is the present inventors, experience that there are difficulties encountered in attempting to transmit and receive high data-rate data signals on bandwidth limited conductive transmission media. For example, the present inventors have observed that circuitry known in the art for transmitting and receiving high data-rate data signals is typically constructed using complex configurations of discrete circuit components that are not readily integratable and that entail significant expense.

Attempts to increase the transmission data rate are also restricted by physical limitations o the ability to increase the data transmission rate. For example, an increase in the data transmission rate is accompanied by an increase in the high frequency spectral content of the transmitted signal. Such an increase in the high frequency spectral content can result in unacceptably high electromagnetic emission levels which are caused by common mode components on the transmission media. As also known in the art, high frequency spectral content is also a cause of undesirable crosstalk. Also, the levels of electromagnetic emissions resulting from transmission of digital information are subject to conformance with federal and international standards, for example the standards established by the Federal Communications Commission. Therefore, the data transmission rate can be limited by these considerations.

The emissions associated with the high frequency spectral content of a high data-rate data signal may in general be reduced by any M-ary encoding scheme known in the art, such as modified duobinary encoding. Such a modified duobinary encoding technique is disclosed in U.S. Pat. No. 3,993,953 issued on Nov. 23, 1976. Such encoding schemes, however, require driving a transmission line, such as a two-conductor cable, with a multi-level signal. The requirements to encode a high data-rate signal as a multi-level signal, transmit the multi-level signal, and to receive and decode the multi-level signal, further add to the complexity and expense of the apparatus for transmitting and receiving high data-rate signals.

Another problem associated with transmitting and receiving high data-rate signals over a two-conductor unshielded line or other medium is the known attenuating effect such a medium has on the high frequency components of the transmitted signal. While the above-noted encoding schemes reduce the high frequency spectral content of the transmitted data signal, the transmitted high data-rate signal will nevertheless be subjected to some distortion caused by such attenuation. This distortion in turn can, undesirably, cause errors in the detection of the transmitted data. One technique known in the art that is used in an attempt to compensate for such attenuation and distortion of high data-rate data signals is the implementation of line equalization circuitry at the transmitting or receiving end of the transmission line. Such circuitry typically includes an energy storage component, e.g., a capacitor, for storing energy that is subsequently added to the transmitted or received signal in a manner intended to compensate for the attenuated high frequency component of the transmitted signal. Disadvantageously, the energy added to the data signal from the capacitor corresponds to energy extracted from a previous portion of the data signal and therefore cannot be uniquely adapted to each pulse of the digital signal being transmitted or received.

Also as known in the art, the discharge of energy from such line equalization circuitry, whether at the transmitter or receiver, can cause overshoots at transitions in the data signal being compensated. Such overshoots can cause errors in the detection of the transmitted data at the receiver.

SUMMARY OF THE INVENTION

The present invention has been made in view of the above circumstances and has as an object to provide effective transmitting and receiving of a high data-rate data signal and, preferably, apparatus therefor that is relatively simple and inexpensive in its construction.

It is another object of the present invention to provide apparatus, for transmitting and receiving a high data-rate data signal, that compensates for the attenuation of high data-rate data signals, even without line equalization circuitry.

Additional objects and advantages of the invention will be set forth in part in the description which follows and in part will be obvious from the description, or may be learned by practice of the invention. The objects and advantages of the invention may be realized and obtained by means of the instrumentalities and combinations particularly pointed out in the appended claims.

To achieve the objects and in accordance with the purposes of the invention, as embodied and broadly described herein, the present invention is directed to a transmitter for transmitting digital data. The transmitter comprises means for encoding a binary data signal as a three-level modified duobinary encoded signal, and for generating first and second two-level driving signals representative of the modified duobinary encoded signal, and mean for generating the first and second driving signals in synchronism.

The invention is also directed to a receiver for receiving a three-level encoded data signal. The receiver comprises means for generating a first threshold voltage and a bias voltage, the first threshold voltage being greater than the bias voltage, and phase splitting means, operatively coupled to receive the bias voltage, for splitting the encoded signal into first and second complementary three-level signals having a middle voltage level equal to the bias voltage. The receiver also includes means, operatively coupled to receive the first and second three-level signals and the first threshold voltage, for generating a second threshold voltage that is equal to or greater than the first threshold voltage according to a peak level of the first and second three-level signals, and signal detection means, operatively coupled to receive the first and second three-level signals and the second threshold voltage, for detecting logic levels in the first and second three-level signals relative to the second threshold voltage, and for forming a serial binary signal having the detected logic levels.

The invention is further directed to a method for transmitting and receiving digital data. The method comprises steps of encoding a serial binary data signal as a three-level modified duobinary encoded signal for transmission, receiving the encoded modified duobinary signal, and generating a first threshold voltage and a bias voltage, the first threshold voltage being greater than the bias voltage. The method also includes the steps of splitting the received signal into first and second complementary three-level signals having a middle voltage level equal to the bias voltage and generating a second threshold voltage that is equal to or greater than the first threshold voltage according to a peak level of the first and second complementary three-level signals. The method further includes the steps of detecting logic levels in the first and second complementary three-level signals and forming a serial binary signal having the detected logic levels.

BRIEF DESCRIPTION OF THE DRAWINGS

The accompanying drawings, which are incorporated in and constitute a part of this specification illustrate embodiments of the invention and, together with the description, serve to explain the objects, advantages, and principles of the invention. In the drawings.

DESCRIPTION OF THE PREFERRED EMBODIMENTS

Figure 1:
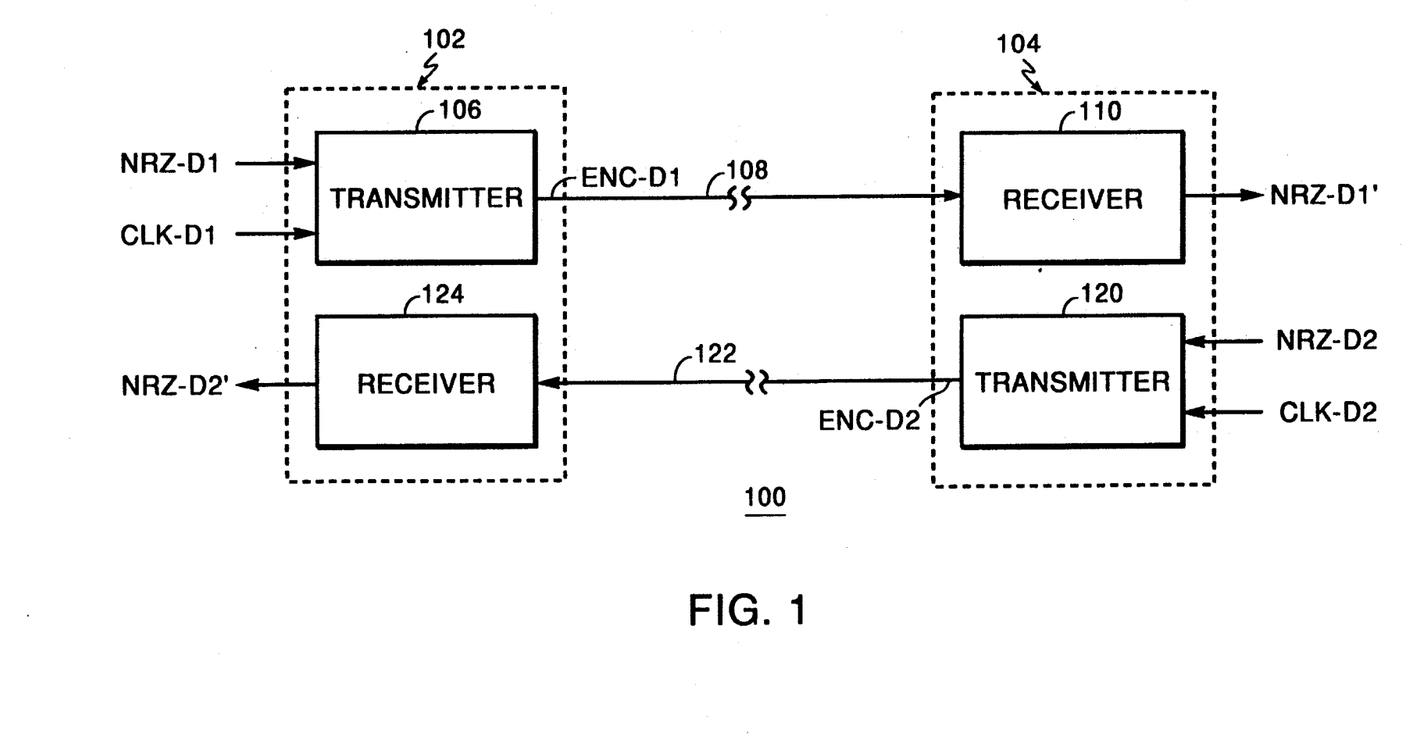
FIG. 1 illustrates a data transmission system including transceiver circuits constructed in accordance with the present invention.

In reference to the drawings, FIG. 1 illustrates a data transmission system 100 including substantially identical transceiver circuits 102 and 104 each constructed in accordance with the present invention. Transceiver circuit 102 includes a transmitter circuit 106 for receiving a serial data signal such as a high data-rate NRZ (non-return-to-zero) binary data signal NRZ-D1 having a data rate of, for example, 125 Mbit/s, and a clock signal CLK-D1, with which signal NRZ-D1 is synchronized, having a clock frequency of, for example, 125 MHz. The generation of a clock signal with an associated data signal is a well-known practice in the art. Transmitter circuit 106 is constructed to encode the binary data signal as an encoded data signal ENC-D1 and transmit the encoded data signal onto a transmission path, such as a two-conductor unshielded transmission line 108.

Transceiver circuit 104 includes a receiver circuit 110 for receiving the encoded data signal ENC-D1 on transmission line 108, decoding the received signal, detecting the data therein and providing a high data-rate NRZ binary signal NRZ-D1' that corresponds to and contains the same data as signal NRZ-D1.

Transceiver circuit 104 also includes a transmitter circuit 120 that is constructed substantially identically to transmitter circuit 106, for receiving a high data-rate NRZ binary data signal NRZ-D2 having a data rate of, for example, 125 Mbit/s, and a clock signal CLK-D2 with which signal NRZ-D2 is synchronized, having a clock frequency of, for example, 125 MHz. Transmitter circuit 120 is constructed to encode the binary data signal NRZ-D2 as an encoded data signal ENC-D2 and transmit the encoded data signal on a transmission path, such as a two-conductor unshielded transmission line 122.

Transceiver circuit 102 also includes a receiver circuit 124 that is constructed substantially identically to receiver circuit 110 for receiving the encoded data signal ENC-D2 on transmission line 122, decoding the received signal, detecting the data therein and providing a high data-rate NRZ binary signal NRZ-D2' that corresponds to and contains the same data as signal NRZ-D2.

Figure 2:
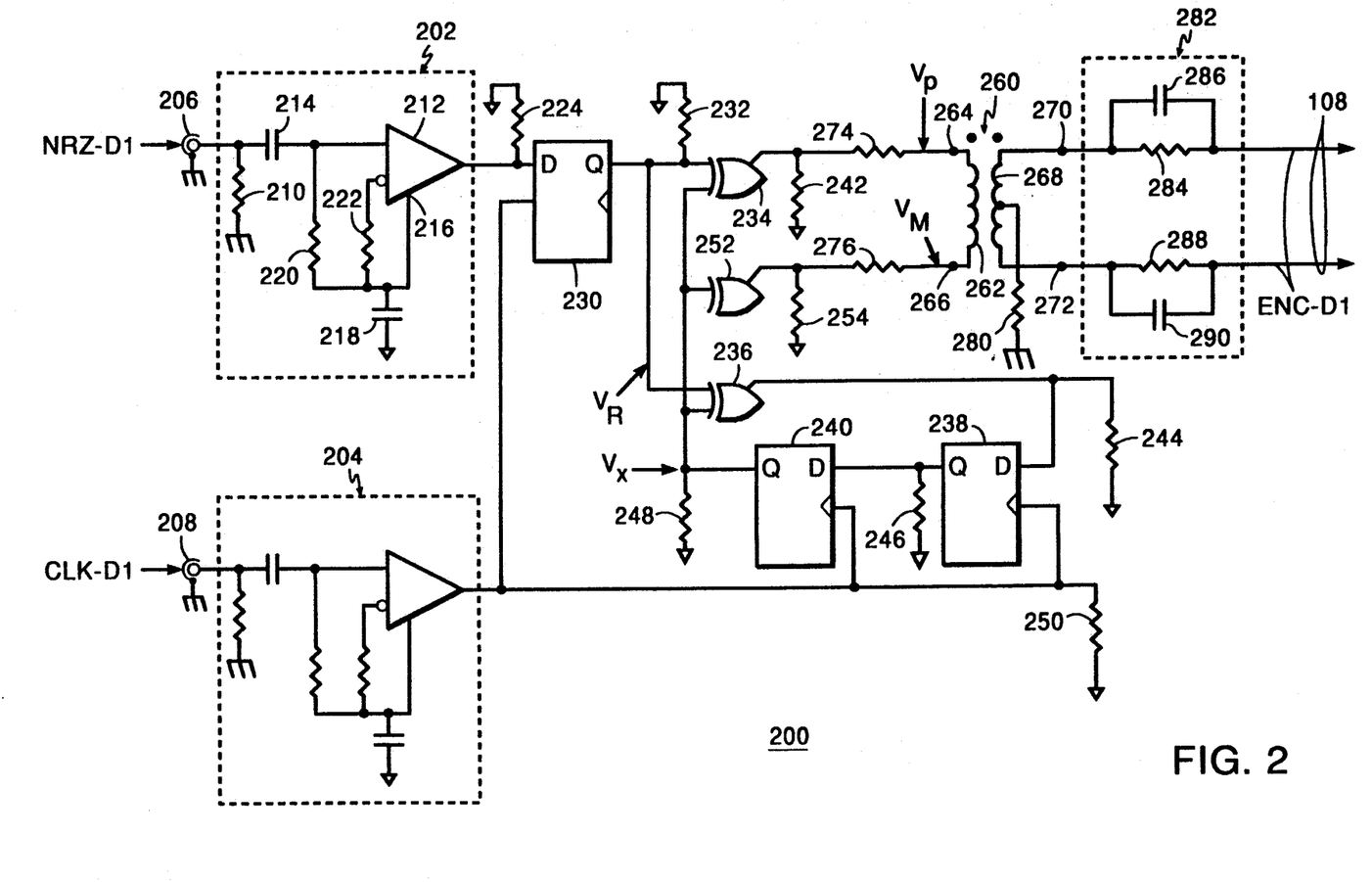
FIG. 2 illustrates a transmitter circuit constructed in accordance with an embodiment of the present invention.

Transmitter circuits 106 and 120 can each be provided as a transmitter circuit 200 illustrated in FIG. 2 and constructed in accordance with an embodiment of the invention. In FIG. 2, transmitter circuit 200 is illustrated as being implemented in a transceiver circuit, or in a simple transmission terminal apparatus, for receiving data signal NRZ-D1 and transmitting encoded data signal ENC-D1 on transmission line 108. The corresponding local receiver of a transceiver is not shown, but could be like that in FIG. 4. FIGS. 3A-3G are timing diagrams illustrating waveforms of signals received by and occurring in transmitter circuit 200.

In FIG. 2, transmitter circuit 200 is preferably constructed using emitter coupled logic (ECL) circuitry. In general with respect to circuits described herein as constructed using ECL circuitry, the power supplies for the ECL circuitry are defined as an externally generated most positive power supply voltage $V_{CC}$ and an externally generated most negative power supply voltage $V_{EE}$.

In reference to FIG. 2, transmitter circuit 200 includes optional line receiver circuits 202 and 204. Line receiver circuits 202 and 204 are respectively provided to convert the logic signal levels of the data and clock signals as received, to signal levels that are compatible with the ECL circuitry of transmitter circuit 200. In the illustrated embodiment, such compatible signal levels range, for example, between $-0.8$ volts and $-1.8$ volts. Thus, if the data signal NRZ-D1 and associated clock signal CLK-D1 are provided to transmitter circuit 200 with signal levels compatible with the ECL circuitry, line receiver circuits 202 and 204 are not required. It is noted that when circuits 202 and 204 are not required, it is preferred that cables 206 and 208, or any other connecting media, have a length corresponding to no more than approximately 15% of the bit period of the data signal. In FIG. 2, signals NRZ-D1 and CLK-D1 are respectively received on coaxial cables 206 and 208, having respective shields connected to a signal reference referred to herein as ground. For example, for the above noted signal range, ground is conductively connected to voltage $V_{CC}$.

Since, in the illustrated embodiment, both of cables 206 and 208 are terminated by identical elements and line receiver circuits 202 and 204 are constructed identically, only the termination of cable 206 and line receiver circuit 202 are described in detail. In reference to FIG. 2, a resistor 210 is connected between the inner conductor of cable 206 and ground to terminate cable 206. Of course, if transmitter circuit receives signals NRZ-D1 and CLK-D1 via media other than coaxial cable, then techniques suitable for the termination of such other media would instead be used in circuit 200.

The inner conductor of cable 206 is connected to the non-inverted input terminal of a differential amplifier 212 of circuit 202 through a DC blocking, signal-coupling capacitor 214. Amplifier 212 is preferably constructed using ECL circuitry and includes an internal bias reference volta $V_{BB}$ at output terminal 216, $V_{BB}$ also being known in the art as a switching threshhold voltage of the amplifier, which is connected through a capacitor 218 to the voltage $V_{EE}$ for transmitter circuit 200, which is designated by the symbol "∇". A resistor 220 is connected between the non-inverting input terminal of amplifier 212 and capacitor 218, and a resistor 222 is connected between the inverting input terminal of amplifier 212 and capacitor 218. The combination of capacitor 218 and resistors 220 and 222 serve to bias the operation of amplifier 212 so that it reproduces the data signal applied thereto with a signal level in the desired range compatible with ECL circuitry. The values for capacitor 218 and resistors 220 and 222 listed below in Table 1 are suitable for causing amplifier 212 to provide the above noted exemplary ECL compatible signal level range at its output terminal.

As known in the art, devices constructed with ECL circuitry require provision of a load resistor connected between the device output transistor and the voltage $V_{EE}$. In this regard, a resistor 224 is provided as a load resistor connected between the output terminal of amplifier 212 and $V_{EE}$.

Figure 3A:
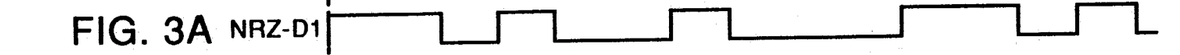
FIGS. 3A-3G illustrate timing diagrams of waveforms received by and occurring in the transmitter circuit illustrated in FIG. 2, and FIGS. 3H-3L illustrate waveforms occurring in a corresponding receiver circuit, such as illustrated in FIG. 4.
Figure 3B:
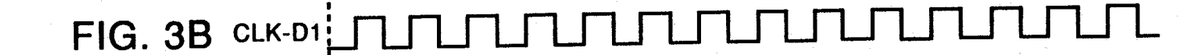
Figure 3C:
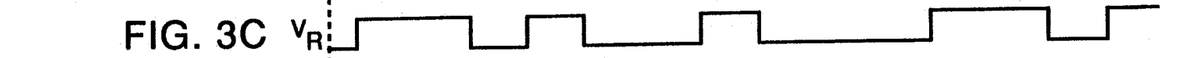

Signals NRZ-D1 and CLK-D1, as provided by line receiver circuits 202 and 204, are respectively applied to the data and clock inputs of a flip-flop circuit 230 in order to re-time the data signal with the clock signal. A data signal, designated $V_R$, is provided on the data output terminal Q of flip-flop circuit 230 and is synchronized with clock signal CLK-D1. FIGS. 3A, 3B and 3C respectively illustrate signals NRZ-D1, CLK-D1 and $V_R$. A load resistor 232 is connected to the data output terminal of flip-flop circuit 230.

Figure 3D:
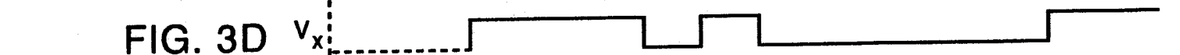

In reference to FIG. 2, signal $V_R$ is applied to respective first inputs of exclusive-OR (XOR) gates 234 and 236. An output terminal of XOR gate 236 is connected to the data input terminal of a flip-flop circuit 238. The data output terminal of flip-flop circuit 238 is connected to the data input terminal of a flip-flop circuit 240. The respective clock inputs of flip-flop circuits 238 and 240 are connected to receive clock signal CLK-D1. As a result, a data signal, designated $V_X$ and illustrated in FIG. 3D, provided on the data output terminal of flip-flop circuit 240 is delayed by two clock periods with respect to signal $V_R$. The re-timing performed by flip-flop circuit 230 is essential in order to ensure signal $V_R$ is synchronous with signal $V_X$. Load resistors 242, 244, 246 and 248 are connected to the output terminals of XOR gates 234 and 236 and flip-flop circuits 238 and 240. A load resistor 250 is connected to the output terminal of the differential amplifier of line receiver circuit 204. It is noted that if signals NRZ-D1 and CLK-D1 are provided with ECL signal levels and receiver circuits 202 and 204 are not used, then load resistors 224 and 250 serve as load resistors for the remote ECL circuit providing signals NRZ-D1 and CLK-D1.

In order to satisfy requirements of modified duobinary encoding, the delayed data signal $V_X$ is applied to respective second input terminals of XOR gates 234 and 236 and is thereby logically combined with the non-delayed data signal $V_R$ in both XOR gates 234 and 236. As a result, the data signal $V_X$ that is delayed by two clock periods is the XOR logic result of that delayed signal and the non-delayed data signal $V_R$. The data signal provided by XOR gate 234 is designated signal $V_P$ illustrated in FIG. 3E. The delayed data signal $V_X$ is also applied to a first input terminal of an XOR gate 252, the second input terminal of which is unconnected. A load resistor 254 is connected to the output terminal of XOR gate 252.

XOR gate 252 is provided to delay signal $V_X$ by an amount equal to the delay incurred by signal $V_R$ when it passes through XOR gate 234. XOR gate 252 thus provides the delayed data signal $V_M$, a which is illustrated in FIG. 3F. Signal $V_X$ is provided by flip-flop circuit 240 and is therefore synchronized with clock signal CLK-D1 and is not precisely synchronized with signal $V_P$. Since it is desired herein to combine the signal delayed by two clock periods with the signal $V_P$ to generate a line driving signal and in view of the high data rate of the signal being transmitted by transmitter circuit 200, it is important that signal $V_X$ be delayed to create signal $V_M$ which is in synchronism with signal $V_P$. For example, a skew exceeding 50% of the rise time of signals $V_P$ and $V_M$ would, disadvantageously, result in corruption of the data pulses being transmitted.

Transmitter circuit 200 further includes a line driving transformer 260 having a primary winding 262 with winding terminals 264 and 266, and a secondary winding 268 having winding terminals 270 and 272. The winding polarities of transformer 260 for the illustrated embodiment are indicated by the dot markings in FIG. 2. The respective outputs of XOR gates 234 and 252 are coupled to primary winding terminals 264 and 266 through identical resistors 274 and 276. Resistors 274 and 276 are provided to limit the magnitude of data signals $V_P$ and $V_M$ and thereby limit the magnitude of electromagnetic emissions from transmission line 108.

Figure 3E:
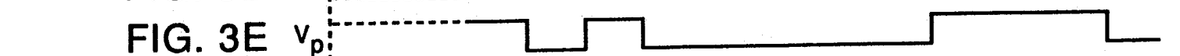
Figure 3F:
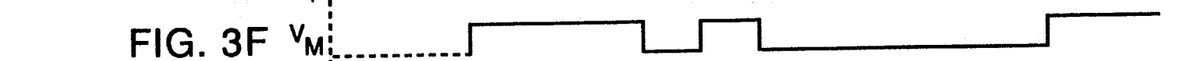
Figure 3G:
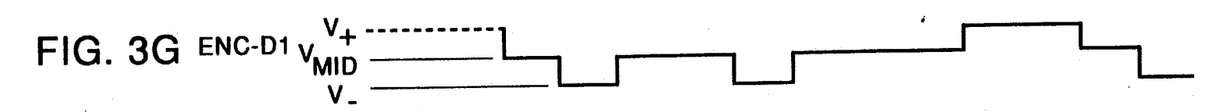

As seen in FIGS. 3E and 3F, each of signals $V_P$ and $V_M$ are binary signals. Those signals are applied to the terminals of primary winding 262 to effect the subtraction of those signals in winding 262 to generate the three-level modified duobinary encoded line driving signal ENC-D1 (FIG. 3G) across the terminals of secondary winding 268. As seen in FIG. 3G, the three-level signal ENC-D1 consist of signal levels $V_+$, $V_{MID}$ and $V_-$ respectively. Secondary winding 268 is center-tapped and connected to ground through a resistor 280. This connection to ground is made in order to provide a termination for any net signal at the center tap of secondary winding 268 that corresponds to noise. This connection also serves to minimize electromagnetic emissions and common mode signals in the conductive transmission media. The provision of resistor 280 is exemplary and that element can be provided as a more complex network in order to meet applicable grounding requirements.

Transmitter circuit 200 can optionally include a line equalizer circuit 282 to compensate for the high frequency signal attenuation effects of transmission line 108. Circuit 282 includes the parallel combination of a resistor 284 and a capacitor 286, connected in series between winding terminal 270 and one conductor of transmission line 108. Circuit 282 also includes the parallel combination of a resistor 288 and a capacitor 290 connected in series between winding terminal 272 and the other conductor of transmission line 108. Exemplary values provided below in Table 1 for the elements of circuit 282 are suitable for compensating for typical lengths of transmission line 108, e.g., 100 meters.

In the operation of transmitter circuit 200, the received high data-rate data signal NRZ-D1 is re-timed in flip-flop circuit 230 and encoded in accordance with modified duobinary encoding requirements to generate the two binary signals $V_P$ and $V_M$. Signals $V_P$ and $V_M$ are subtracted in primary winding 262 of transformer 260 to generate the three-level modified duobinary encoded line driving signal ENC-D1 across secondary winding 268 of transformer 260. As seen in FIGS. 3E-3G, when signals $V_P$ and $V_M$ both have high logic levels or both have low logic levels, the result of their subtraction is the signal level $V_{MID}$ of signal ENC-D1. When signals $V_P$ and $V_M$ have respective high and low logic levels, the result of their subtraction is the signal level $V_+$ of signal ENC-D1. Also, when signals $V_P$ and $V_M$ have respective low and high logic levels, their subtraction results in the signal level $V_-$ of signal ENC-D1. Thus, transmitter circuit 200 utilizes binary logic to generate binary signals that are used to drive transmission line 108 with a high data rate three-level signal. In the illustrated embodiment, the inherent speed of ECL circuitry facilitates such high data rate transmission.

It is noted that the operation of transmitter circuit 200 represented by the timing diagrams illustrated in FIGS. 3A-3G is based on the assumption that circuit 200 was previously idle. As a result, the data contained in signal NRZ-D1 during the first two clock periods is lost.

As described above, transmission line 108 is optionally driven by signal ENC-D1 through line equalizer circuit 282 which compensates for the attenuation by transmission line 108 of high frequency signal components.

Without limitation, Table 1 identifies commercially available components for constructing transmitter circuit 200.

TABLE 1

| COMPONENT | IDENTITY |
|---|---|
| Amplifier 21 | 10KH116 |
| Capacitors 214, 218 | 0.01 µF |
| Capacitors 286, 290 | 100 pF |
| Flip-flops 230, 238, 240 | 10KH131 |
| Resistors 210, 274, 276 | 51 ohms |
| Resistors 220, 222 | 1K ohms |
| Resistors 224, 232, 244, 246, 248 | 510 ohms |
| Resistors 242, 254 | 680 ohms |
| Resistor 250 | 270 ohms |
| Resistor 280 | 43 ohms |
| Resistors 284, 288 | 180 ohms |
| Transformer 260 | 1:1 ratio |

Figure 3H:
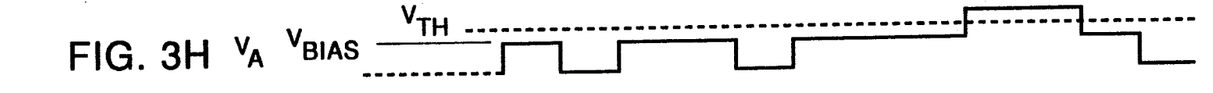
Figure 3I:
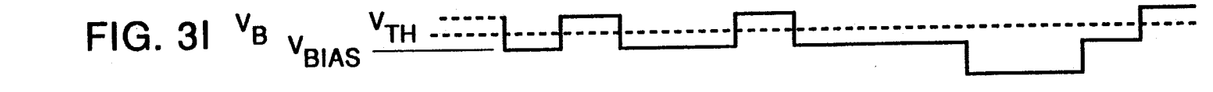
Figure 3J:
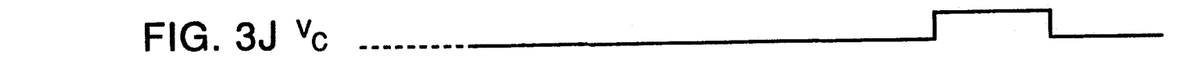
Figure 3K:
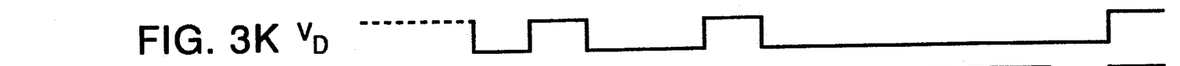
Figure 3L:
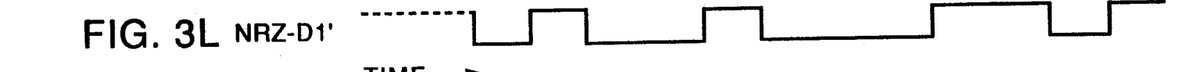
Figure 4:
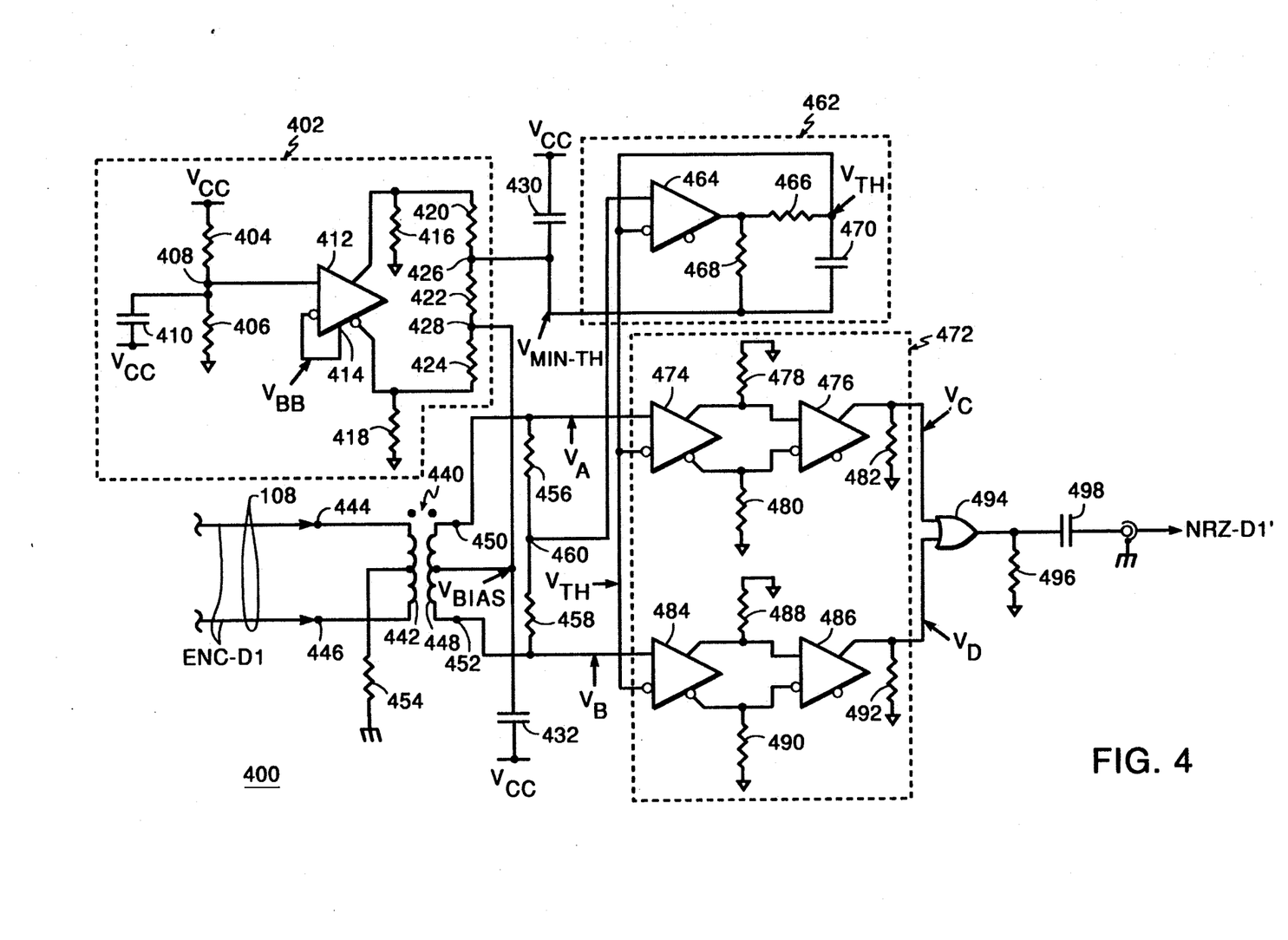
FIG. 4 illustrates a receiver circuit constructed in accordance with an embodiment of the present invention.

Receiver circuits 110 and 124 of system 100 (FIG. 1) can each be provided as a receiver circuit 400 illustrated in FIG. 4 and constructed in accordance with an embodiment of the invention. Receiver circuit 400 is preferably constructed using ECL circuitry. FIGS. 3H-3L are timing diagrams illustrating waveforms of signals occurring in receiver circuit 400. In reference to FIG. 4, receiver circuit 400 includes a bias and minimum threshhold voltage generating circuit 402 that includes resistors 404 and 406 connected in series between voltage $V_{CC}$ and the voltage $V_{EE}$. A tap point 408 between resistors 404 and 406 is connected to the voltage $V_{CC}$ through a bypass capacitor 410.

Circuit 402 includes a differential amplifier 412 having a non-inverting input terminal connected to tap point 408, and an inverting input terminal connected to an internal bias reference voltage $V_{BB}$ output 414 of amplifier 412. Voltage $V_{BB}$ at output 414 corresponds to the volta $V_{BB}$ described above for transmitter 200 of FIG. 2. Load resistors 416 and 418 are connected to the non-inverted and inverted output terminals of amplifier 412. Resistors 404 and 406 form a voltage divider network and are selected to have resistance values which define at tap point 408 a voltage corresponding to the high logic level of the ECL circuitry of receiver circuit 400. In view of the connection of differential amplifier 412, a voltage equal to the high logic level at node point 408 is provided on the non-inverted output of amplifier 412, and a voltage equal to a low logic level for the ECL circuitry is provided on the inverted output. For example and without limitation, for voltages $V_{CC}$ and $V_{BB}$ having values of approximately 5.0 volts and 3.7 volts, respectively, and assuming the values of resistors 404 and 406 shown below in Table 2, the voltage at both tap point 408 and the non-inverted output of amplifier 412 is approximately 4.2 volts, and the voltage at the inverted output of amplifier 412 is approximately 3.2 volts.

Circuit 402 also includes resistors 420, 422 and 424 connected in series. A tap point 426 is defined between resistors 420 and 422, and a tap point 428 is defined between resistors 422 and 424. Resistors 420, 422 and 424 form a voltage divider network such that a bias voltage $V_{BIAS}$ is provided by circuit 402 at tap point 428, and a minimum threshhold voltage $V_{MIN-TH}$ greater than $V_{BIAS}$, is provided by circuit 402 at tap point 426. Tap point 426 is connected to voltage $V_{CC}$ through a bypass capacitor 430. Similarly, tap point 428 is connected to voltage $V_{CC}$ through a bypass capacitor 432. Such connections through bypass capacitors 430 and 432 are provided to minimize the noise content of $V_{BIAS}$ and $V_{MIN-TH}$.

Bias voltage $V_{BIAS}$ is utilized in circuit 400 to establish and fix the midpoint of the logic swings of the received three-level signal, i.e., to correspond to signal level $V_{MID}$ of signal ENC-D1 within circuit 400. The minimum threshhold voltage $V_{MIN-TH}$ is utilized as the minimum voltage which the logic levels of the received data signal must exceed for data detection. As more fully described below, means are provided in circuit 400 for increasing the threshhold voltage above $V_{MIN-TH}$.

For example and without limitation, for the above-noted approximate voltages of 4.2 volts and 3.2 volts respectively provided on the non-inverted and inverted outputs of amplifier 412, and assuming the values of resistors 420, 422 and 424 shown below in Table 2, $V_{BIAS}$ and $V_{MIN-TH}$ have nominal values of approximately 3.70 volts and 3.74 volts, respectively.

Receiver circuit 400 also includes a transformer 440 having a primary winding 442 with terminals 444 and 446, and a secondary winding 448 with terminals 450 and 452. The windings polarities of transformer 440 in the illustrated embodiment are indicated by the dot markings in FIG. 4. Winding terminals 444 and 446 are connected to transmission line 108 to receive signal ENC-D1 (FIG. 3G). A center tap of primary winding 442 is connected to ground through a resistor 454 to provide a path between the center tap of the primary winding and ground for any common mode signal that corresponds to noise. The provision of resistor 454 is exemplary and that element can be provided as a more complex network in order to meet applicable grounding requirements. A center tap of secondary winding 448 is connected to tap point 428 and hence to bias voltage $V_{BIAS}$.

Transformer 440 connected as described above to receive signal ENC-D1 operates as a phase splitter to provide data signals $V_A$ and $V_B$, on secondary winding terminals 450 and 452, respectively corresponding to signal ENC-D1 and its complement. As seen in FIGS. 3H and 3I in which data signals $V_A$ and $V_B$ are illustrated, signal $V_A$ has the same form as signal ENC-D1 with $V_{MID}$ equal to $V_{BIAS}$. Similarly, signal $V_B$ has the form of the complement of signal ENC-D1 with signal level $V_{MID}$ equal to voltage $V_{BIAS}$.

Resistors 456 and 458 are connected in series across secondary winding 448 of transformer 440 in order to form a voltage divider network for monitoring the received data signal across secondary winding 448. The resistances of resistors 456 and 458 are selected so that their sum equals the characteristic impedance of transmission line 108, in order to provide impedance matching and avoid signal reflection or echo on the line. The resistances of resistors 456 and 458 are further selected to develop at a tap point 460 therebetween a voltage that is a desired percentage of the peak voltage value of the received data signal, as more fully described below.

Receiver circuit 400 further includes a threshhold adjusting circuit 462 which is connected to receive the voltage at tap point 460 and minimum threshhold voltage $V_{MIN-TH}$ and to generate a threshhold voltage $V_{TH}$ for detecting data in the received data signal. In particular, circuit 462 is configured to vary the magnitude of voltage $V_{TH}$ in accordance with the desired percentage of the peak value of the received data signal as provided at tap point 460. Threshhold adjusting circuit 462 is disclosed and claimed in commonly assigned copending patent application Ser. No. 07/723,083 filed on Jun. 28, 1991.

As seen in FIG. 4, threshhold adjusting circuit 462 includes a differential amplifier 464 having a non-inverting input terminal connected to tap point 460. The output terminal of amplifier 464 is connected to the inverting input terminal of amplifier 464 through a resistor 466. A load resistor 468 for the output of amplifier 464 is connected, at one end, to a node between the output terminal of amplifier 464 and resistor 466, and, at the other end, to tap point 426. A capacitor 470 is connected between the inverting input terminal of amplifier 464 and tap point 426. The threshold voltage $V_{TH}$ is provided at a node between resistor 466 and capacitor 470, which is connected to the inverting input terminal of amplifier 464.

Receiver circuit 400 additionally includes a data detection circuit 472 connected to receive data signals $V_A$ and $V_B$ and threshhold voltage $V_{TH}$ and to provide binary detected data signals $V_C$ and $V_D$ which represent the data detected in signals $V_A$ and $V_B$, respectively. Signals $V_C$ and $V_D$ are respectively illustrated in FIGS. 3J and 3K. Circuit 472 includes a differential amplifier 474 connected to receive data signal $V_A$ and threshhold voltage $V_{TH}$ on its non-inverting and inverting inputs, respectively. Amplifier 474 generates a detected data signal output on its non-inverted output terminal, and the complement thereof on its inverted output terminal, whenever the magnitude of signal $V_A$ exceeds voltage $V_{TH}$. As a result, the data carried by signal $V_A$ corresponding to the portions of signal ENC-D1 having the signal level $V_+$ are detected relative to threshold voltage $V_{TH}$. The outputs of amplifier 474 are connected to another differential amplifier 476 to amplify and provide the detected data signal on the non-inverted output terminal of amplifier 476 as detected data signal $V_C$. Load resistors 478, 480 and 482 are connected to the output terminals of amplifiers 474 and 476 as shown in FIG. 4.

Circuit 472 also includes differential amplifier 484 connected to receive data signal $V_B$ and threshhold voltage on its non-inverting and inverting inputs, respectively. Amplifier 484 generates a detected data signal output on its output terminal, and the complement thereof on its inverted output, whenever the magnitude of $V_B$ exceeds threshhold voltage $V_{TH}$. As a result, since signal $V_B$ is the complement of data signals $V_A$ and signal ENC-D1, the data carried by signal $V_B$ corresponding to the portions of signal ENC-D1 having the signal level $V_-$ are detected relative to threshhold voltage $V_{TH}$. The outputs of amplifier 484 are connected to another differential amplifier 486 to amplify and provide the detected data signal on the non-inverted output terminal of amplifier 486 as detected data signal $V_D$. Load resistors 488, 490 and 492 are connected to the output terminals of amplifiers 484 and 486 as shown in FIG. 4.

Receiver circuit 400 also includes an OR gate 494 connected to receive detected data signals $V_C$ and $V_D$ and to provide a combined binary data signal. A load resistor 496 is connected between the output terminal of OR gate 494 and the $V_{EE}$ voltage bus. The combined binary data signal is passed through a capacitor 498, for blocking DC components of the detected signal, and provided at the output of receiver circuit 400 as received binary data signal NRZ-D1'. In the case where the combined binary data signal is applied to another ECL circuit, capacitor 498 is not required. Signal NRZ-D1', as illustrated in FIG. 3L, is substantially identical to originally transmitted signal NRZ-D1 except for the propagation delay caused by transmission line 108 and the logic circuitry.

In the operation of receiver circuit 400, bias and minimum threshhold voltage generating circuit 402 generates voltages $V_{BIAS}$ and $V_{MIN-TH}$ at tap points 428 and 426, respectively. Circuit 402 performs a temperature compensating function since, as the temperature experienced by receiver circuit 400 varies, the voltages provided o the outputs of differential amplifier 412 vary in like fashion so that voltages $V_{BIAS}$ and $V_{MIN-TH}$ also vary in like fashion and the voltage therebetween remains substantially constant. Also, more broadly, to the extent other circuit elements are integrated on a common substrate with amplifier 412, the operating characteristics of the commonly integrated elements will vary in like fashion with temperature. For example, the 10KH116 integrated circuit chip listed below in Table 2 contains three differential amplifiers, so that by using that circuit chip several of the amplifiers of receiver circuit 400 can be integrated in a common substrate.

Also with respect to the operation of receiver circuit 400, received data signal ENC-D1 is split by transformer 440 to provide data signals $V_A$ and $V_B$ which each have a middle voltage level equal to voltage $V_{BIAS}$ because of the connection of the center tap of secondary winding 448 to tap point 428. Data signals $V_A$ and $V_B$ are applied to data detection circuit 472 for detecting data with respect to the threshhold voltage $V_{TH}$. Voltage $V_{TH}$ is continuously adjusted by threshhold adjusting circuit 462 in which capacitor 470 is charged when the voltage at tap point 460 exceeds the current value of $V_{TH}$. Thus, voltage is increased by charging capacitor 470, that capacitor being discharged through resistors 466 and 468 and by providing input terminal bias current to amplifier 464. In the illustrated embodiment, resistors 456 and 458 are selected to provide a voltage at tap point 460 which is approximately 50% of the peak voltage of received data signal ENC-D1. The resistances listed below in Table 2 provide such a percentage.

Further with respect to the operation of receiver circuit 400, data detection circuit 472, constructed with two-state differential amplifiers, operates to detect the data of the three-level signal ENC-D1. The detected data signals $V_C$ and $V_D$ are combined through OR gate 494 to form the high data rate binary signal NRZ-D1'.

In accordance with the operation of receiver circuit 400, since a voltage difference is maintained between voltages $V_{BIAS}$ and $V_{MIN-TH}$ data detection circuit 472 does not oscillate during periods when no data is being received.

Without limitation, Table 2 identifies commercially available components for constructing receiver circuit 400.

TABLE 2

| Identity | Component |
| --- | --- |
| Amplifiers 412, 464, 474, 476, 484, 486 | 10KH116 |
| Capacitor 410 | 0.047 μF |
| Capacitors 430, 432, 496 | 0.01 μF |
| Capacitor 470 | 4.7 nF |
| OR gate 494 | 10KH105 |
| Resistor 404 | 390 ohms |
| Resistor 406 | 1.8K ohms |
| Resistors 416, 418 | 330 ohms |
| Resistor 420 | 470 ohms |
| Resistor 422 | 47 ohms |
| Resistors 424, 468, 478 480, 482, 488, 490, 492, 498 | 510 ohms |
| Resistor 456 | 24 ohms |
| Resistor 458 | 75 ohms |
| Resistor 466 | 5.1 ohms |
| Transformer 440 | 1:1 ratio |

Figure 5:
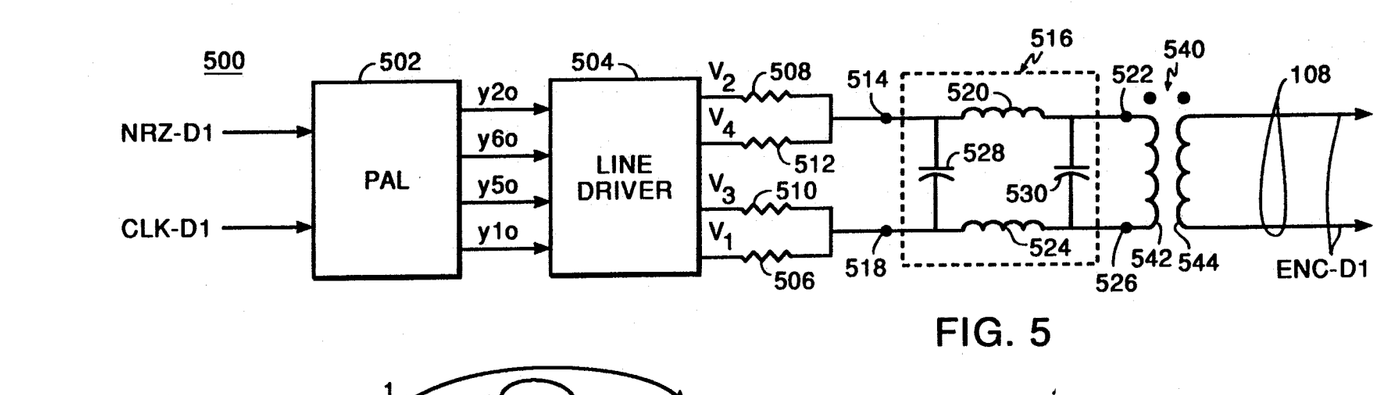
FIG. 5 illustrates a transmitter circuit constructed in accordance with another embodiment of the present invention.

Transmitter circuits 106 and 120 (FIG. 1) can also each be provided as a transmitter circuit 500 illustrated in FIG. 5 and constructed in accordance with another embodiment of the invention. In FIG. 5, transmitter circuit 500 is illustrated as being implemented in transceiver circuit 102 for receiving data signal NRZ-D1 and clock signal CLK-D1 and transmitting encoded data signal ENC-D1 on transmission line 108.

In reference to FIG. 5, transmitter circuit 500 includes a programmable array logic (PAL) circuit 502 which is programmed as a state machine for encoding data signal NRZ-D1 in accordance with modified duobinary encoding and for selectively adding precharge to the encoded data signal to compensate for the attenuating effects of transmission line 108. PAL circuit 502 is connected to receive data signal NRZ-D1 and clock signal CLK-D1 and provides binary control signals y1o and y2o which embody signal encoding information and signals y5o and y6o which embody signal precharging information, as described more fully below.

In the illustrated embodiment, PAL circuit 502 is preferably provided as a device no. PAL16R6 manufactured by Advanced Micro Devices of Sunnyvale, Calif., which is suitable for use at a data rate of 62.5 Mbit/s. Since that device is constructed with TTL logic, it has an output impedance value sufficiently large to limit the ability of the device to directly drive transmission line 108. In view of this limitation, transmitter circuit 500 also includes a line driver circuit 504 that is responsive to the binary control signals provided by PAL circuit 502 to generate binary line driving signals $V_1$, $V_2$, $V_3$ and $V_4$. In particular, line driver circuit 504 generates line driving signals $V_1$ and $V_2$ to have the same logic values as and respectively correspond to binary control signals y1o and y2o for driving transmission line 108 with a three-level modified duobinary encoded data signal. Line driver circuit 504 also generates line driving signals $V_3$ and $V_4$ to have the same logic values as and respectively correspond to binary control signals y5o and y6o for driving transmission line 108 with a precharge signal that supplements the line driving signals $V_1$ and $V_2$.

Thus, line driver circuit 504 is selected to have a sufficiently low output impedance to enable driving transmission line 108. For example, line driver circuit 504 can be provided as a device no. ACT-245 driver circuit manufactured by Texas Instruments Co. of Dallas, Tex. That driver circuit has a TTL input terminal stage compatible with the above-noted PAL16R6 device, and a CMOS output stage.

Transmitter circuit 500 further includes resistors 506, 508, 510 and 512 connected to the outputs of line driver circuit 504 to respectively receive line driving signals $V_1$, $V_2$, $V_3$ and $V_4$ Resistors 506–512 are provided to match the resistance of transmission line 108 and to set the amount of precharge added to the encoded signal, as more fully described below. Such a resistance match is achieved when the sum of the parallel combination of resistors 508 and 512 and the parallel combination of resistors 506 and 510 equals the characteristic impedance of transmission line 108. It is preferred herein to approximately match resistors 506–512 to the characteristic impedance of transmission line 108 in order to reduce an echo phenomenon known in the art. That phenomenon results from a mismatch between driver and transmission line impedances which can cause signal reflections from signals arriving from the transmission line at the interface between the line driver and the transmission line.

Resistors 508 and 512 are connected together, at an end remote from line driver circuit 504, to an input terminal 514 of a low pass filter 516. Resistors 506 and 510 are connected together, at an end remote from line driver circuit 504, to an input terminal 518 of filter 516.

Low pass filter 516 is provided to remove undesirable higher harmonics from the encoded signal being transmitted. Filter 516 includes an inductor 520 connected between input terminal 514 and an output terminal 522, and an inductor 524 connected between input terminal 518 and an output terminal 526. Filter 516 also includes a capacitor 528 connected across input terminals 514 and 518 and a capacitor 530 connected across output terminals 522 and 526.

For example and without limitation, low pass filter 516 can be constructed to have a frequency response characteristic with a cutoff at approximately 40 MHz when the data rate is 62.5 Mbit/s. In accordance with one construction of filter 516 that has such a characteristic, inductors 520 and 524 have the same inductance value of approximately 0.4 µH. Also, capacitors 528 and 530 have the same capacitance value of approximately 40 pF.

Transmitter circuit 500 additionally includes a line driving transformer 540 including a primary winding 542 connected to output terminals 522 and 526 of filter 516 and a secondary winding 544 connected to transmission line 108. In the illustrated embodiment, transformer 540 has a 1:1 turns ratio. Also in the illustrated embodiment, the winding polarities of transformer 540 are indicated by the dot markings in FIG. 5.

Figure 6:
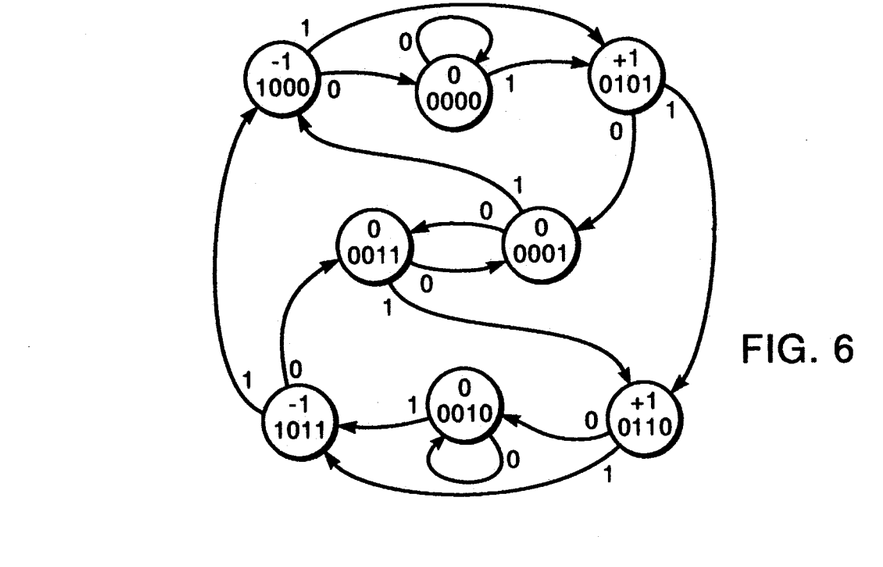
FIG. 6 illustrates a state diagram of an encoding state machine implemented in the transmitter circuit illustrated in FIG. 5.

FIG. 6 illustrates a state diagram of an encoding state machine in accordance with which PAL circuit 502 is programmed to encode data signal NRZ-D1 as a three-level modified duobinary encoded signal and to generate binary control signals y1o and y2o. In the illustrated embodiment, the three signal levels of the modified duobinary signal, without precharge, are represented as +1, 0 and −1 signal levels. In FIG. 6, each state balloon of the encoding state machine includes a four bit number in the lower portion of the balloon. The left-most two bits of the four bit number correspond to binary control signals y1o and y2o. The right-most two bits of the four bit number are selected so that each state has associated with it a unique four bit state identifying number. A single numeral within each state balloon, having the value +1, 0, or −1, represents the one of the three possible signal levels of the modified duobinary encoded signal corresponding to that state. The values of binary control signals y1o and y2o also indicate the signal level of the modified duobinary encoded signal. In particular, the values 01, 10 and 00 for the y1o and y2o control signals respectively correspond to the encoded signal levels +1, −1 and 0.

In reference to FIG. 6, the 1 or 0 bit outside each state balloon adjacent to each state transition line leaving the state balloon, corresponds to the next bit of data received in data signal NRZ-D1. Transition from one state of the encoding state machine to another is determined by the next bit of data received in data signal NRZ-D1.

Figure 7A:
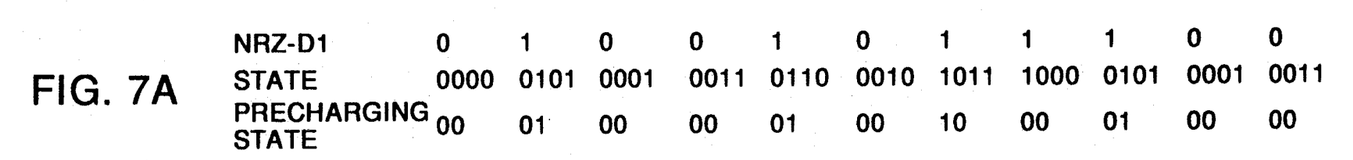
Figure 7B:
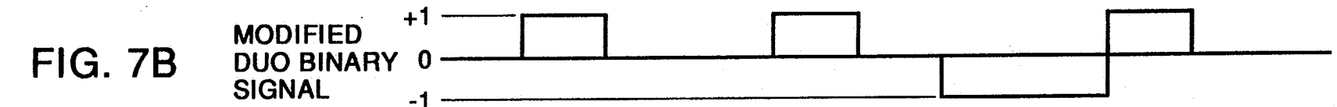
FIGS. 7B and 7C illustrate waveforms of data signals transmitted by the transmitter circuit illustrated in FIG. 5, and FIG. 7A lists information regarding the data signal waveforms.

FIG. 7B illustrates a modified duobinary signal which is generated in accordance with the encoding state machine illustrated in FIG. 6 for the data values and state identities shown in FIG. 7A. In FIG. 7B, the three-level modified duobinary signal is illustrated as having the above noted positive and negative levels respectively designated +1 and −1 and the middle signal level designated 0.

As an example of the operation of the encoding state machine illustrated in FIG. 6, if the encoding state machine is in state 0110 corresponding to the state balloon at the lower right of FIG. 6, and if the next bit of data received in data signal NRZ-D1 is a 0, then the state machine transitions to state 0010 at the lower center of FIG. 6. A graphical representation of the transition of the modified duobinary signal corresponding to the state change is shown in FIGS. 7A and 7B. The state 0110 is shown in FIG. 7A and its left-most two bits have the values 0 and 1 respectively corresponding to binary control bits y1o and y2o. As seen in FIG. 7B, the signal level of the modified duobinary encoded signal corresponding to state 0110 is +1. Upon transition to state 0010, the values of binary control signals y1o and y2o become 0 and 0, respectively, and the signal level of the modified duobinary encoded signal changes to 0.

Figure 8:
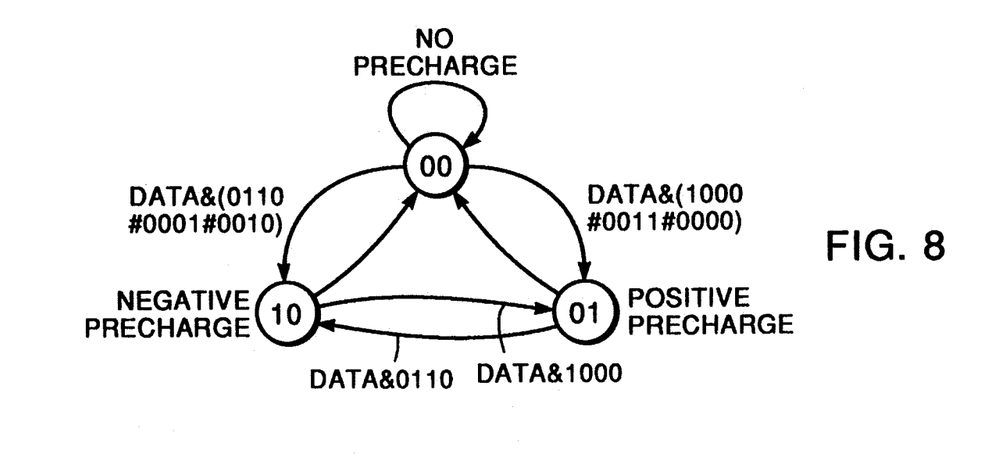
FIG. 8 illustrates a state diagram of a precharging state machine implemented in the transmitter circuit of FIG. 5.

FIG. 8 illustrates a state diagram of a precharging state machine in accordance with which PAL circuit 502 is programmed to determine when precharging is to be added to the encoded signal and to generate binary control signals y5o and y6o. The precharging state machine illustrated in FIG. 8 is driven by the states of the encoding state machine illustrated in FIG. 6. In FIG. 8, each state balloon contains two bits corresponding to signals y5o and y6o that represent a precharge state that is the precharge added to the encoded signal. Values of the precharge state bits of 10, 01 and 00 respectively correspond to adding a negative precharge, a positive precharge, and no precharge to the encoded signal. The conditions for transitioning from one to another state of the precharging state machine are indicated adjacent to the state transition lines. With respect to these transition conditions, the term "data" is satisfied when the next bit of data received in signal NRZ-D1 is a 1. The symbol "&" and "#" respectively corresponds to AND and OR logic. The four bit number included with the conditions for transitioning from one state to another, corresponds to the four bit number that uniquely identifies the present state of the encoding state machine illustrated in FIG. 6.

With respect to the precharging state machine illustrated in FIG. 8, the transitions to the 00 precharge state from either of the 10 or 01 precharge states are unlabeled and correspond to all possible conditions exclusive of the transition conditions indicated. For example, a transition from the 10 state to the 00 state occurs for any condition except the indicated condition "data & 1000".

Figure 7C:
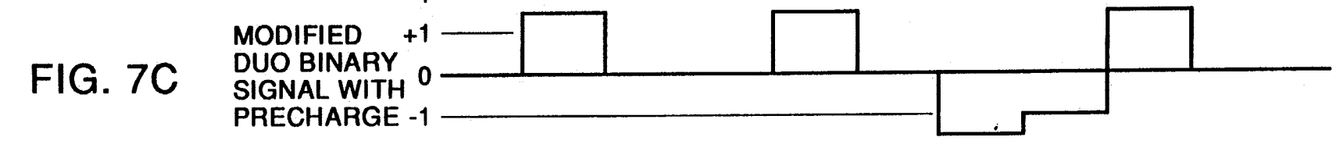

FIG. 7A illustrates successive precharge states resulting from the operation of the precharging state machine illustrated in FIG. 8 based on both the state of the encoding state machine illustrated in FIG. 6 and the data received in signal NRZ-D1. FIG. 7C illustrates the same modified duobinary encoded signal as shown in FIG. 7B, but with precharge added. As an example of the operation of the precharging state machine, if the current precharge state is the 00 state in which no precharge is added, if the next bit of data received in signal NRZ-D1 is a 1, which satisfies the condition "data" (FIG. 8), and if the current state in the encoding state machine is any one of 0110, 0001 or 0010, then the precharging state machine transitions to the 10 state in which a negative precharge is added to the encoded signal the new state of which has a negative signal level. Also referring to FIGS. 6, 7A and 7B, the effect of these conditions on the operation of the encoding state machine (FIG. 6) is shown for the case of the encoding state machine in a present state 0010 and the next bit of received data being a 1. The encoding state machine responds by transitioning to the 1011 state in which the encoded signal has the negative signal level. Thus, the precharging state machine adds a negative precharge to the negative signal level of the encoded data signal.

Inherent in the operation of the precharging state machine and as seen in FIG. 7C, precharging is only performed for one clock period. Further, in cases where the duration of a particular logic level of the encoded signal extends for more than one clock period, a precharge is only added to the first clock period.

Equations (1)-(6) listed below represent the state machines illustrated in FIGS. 6 and 8. The equations are written in a form that is compatible with the CUPL and ABLE computer programs for programming programmable array logic circuits. The CUPL program is published by Logical Devices, Inc. of Fort Lauderdale, Florida and the ABLE program is published by Data I/O, Inc. Redmond Wash. In equations (1)-(6), the symbols "!", "&" and "#" respectively represent NOT, AND and OR logic operations.

example and without limitation, with resistors 506 and 508 each provided with a resistance of approximately 56 ohms and each of resistors 510 and 512 provided with a resistance of approximately 270 ohms, the precharge added to the encoded signal represents an approximate 40% increase in the signal magnitude. The present inventors have found that this magnitude of precharge provides suitable compensation for a transmission line length of approximately 50 meters. In general, the amount of precharge effective to compensate for transmission line attenuation is a function of line length. However, the amount of precharge is also limited by the $$y1o.D = data\&(!y1o\&!y2o\&!y3o\&y4o \; \# \; !y1o\&!y2o\&y3o\&!y4o \; \# \; y1o\&!y2o\&y3o\&y4o \; \# \; !y1o\&y2o\&y3o\&!y4o) \quad (1)$$

$$y2o.D = data\&(!y1o\&!y2o\&!y3o\&!y4 \; \# \; !y1o\&!y2o\&y3o\&y4o \; \# \; y1o\&!y2o\&y3o\&y4o \; \# \; !y1o\&y2o\&y3o\&y4o) \quad (2)$$

$$y3o.D = data\&(!y1o\&!y2o\&y3o\&y4o \; \# \; !y1o\&!y2o\&y3o\&y4o \; \# \; !y1o\&y2o\&!y3o\&y4o \; \# \; !y1o\&y2o\&y3o\&!y4o) \quad (3)$$

$$\#!data\&(!y1o\&!y2o\&!y3o\&y4o \; \# \; !y1o\&!y2o\&y3o\&!y4o \; \# \; y1o\&!y2o\&y3o\&y4o \; \# \; !y1o\&y2o\&y3o\&!y4o)$$
$$y4o.D = data\&(!y1o\&!y2o\&!y3o\&!y4o \; \# \; !y1o\&!y2o\&y3o\&!y4o \; \# \; y1o\&!y2o\&y3o\&!y4o \quad (4)$$
$$\#!y1o\&y2o\&y3o\&!y4o)$$

$$\#!data\&(!y1o\&!y2o\&!y3o\&y4o \; \# \; !y1o\&!y2o\&y3o\&y4o \; \# \; y1o\&!y2o\&y3o\&y4o \; \# \; !y1o\&y2o\&!y3o\&y4o)$$
$$y5o.D = data\&(!y1o\&!y2o\&!y3o\&!y4o \; \# \; !y1o\&!y2o\&y3o\&y4o \; \# \; !y1o\&!y2o\&y3o\&!y4o) \quad (5)$$
$$y6o.D = data\&(y1o\&!y2o\&!y3o\&!y4o \; \# \; !y1o\&!y2o\&y3o\&y4o \; \# \; !y1o\&!y2o\&!y3o\&!y4o) \quad (6)$$

Equations (1)-(6) include the terms y1o, y2o, y5o and y6o defined above. The additional terms y3o and y4o are required for determining the remaining terms. The terms on the right side of each equation represent a current state of terms, while the term on the left side of each equation is the new value being computed. In the above-noted PAL16R6 device, the new values computed by the equations are applied to respective data inputs of D-flip-flop circuits. For this reason, the term on the left side of each equation includes the suffix ".D" to be compatible with the particular PAL device. The newly computed value applied to the data input terminal of each flip-flop circuit of the PAL16R6 device is provided on the output of the flip-flop circuit at the next clock tick of clock signal CLK-D1, which PAL circuit 502 is connected to receive (FIG. 5).

In the operation of transmitter circuit 500, PAL circuit 502 receives data signal NRZ-D1 and clock signal CLK-D1 and in response thereto generates binary control signals y1o, y2o, y5o and y6o in accordance with the operation of the encoding and precharging state machines illustrated in FIGS. 6 and 8. Line driver circuit 504 generates line driving signals V₁-V₄ which directly correspond to control signals y1o, y2o, y5o and y6o, respectively. For example, if PAL circuit 502 generates signals y1o, y2o, y5o and y6o with logic values of 1, 0, 1 and 0, respectively, then line driver circuit 504 generates line driving signals V₁, V₂, V₃ and V₄ with logic levels 1, 0, 1 and 0, respectively. In view of the connection of the outputs of line driver circuit 504 to transformer 540, when signals V₁ and V₂ have logic values 0 to 1, transmission line 108 is driven with the positive signal level of the modified duobinary encoded signal. Similarly, when signals V₁ and V₂ have logic levels 1 and 0, respectively, transmission line 108 is driven with the negative signal level of the encoded signal. Last, when signals V₁ and V₂ both have the logic value 0, transmission line 108 is driven with the middle signal level of the encoded signal.

In the illustrated embodiment, the voltage magnitudes of signals V₃ and V₄ are the same as for signals V₁ and V₂ for like logic levels. The resistance values of resistors 506-512 are selected to set the amount of precharge added to the encoded line driving signal. For additional electromagnetic emissions and consequent crosstalk it may cause. Therefore, the amount of precharge added in a particular application represents a compromise between these competing factors.

More generally, the amount of precharge added by transmitter circuit 500 is set by the resistance values of resistors 506-512 in accordance with the following equations (7)-(9). In equation (9), the signal level $V_{ENC}$ corresponds to the absolute value of either the positive or negative encoded signal level in the absence of precharge, and the signal level $V_{PRE}$ corresponds to the absolute value of either the positive or negative signal level with precharge. For example, if precharging causes the signal level to be increased by 40%, then the ratio $V_{PRE}/V_{ENC}$ is 1.4.

$$R506 = R508 = (R_L/2)*(1 + p) \quad (7)$$
$$R510 = R512 = (R_L/2)*((1 + p)/p) \quad (8)$$
$$\text{where } p = (V_{PRE}/(2*V_{ENC})) - 1 \quad (9)$$
and $R_L$ = resistive portion of the characterstic impedance of the transmission line.

It is noted that the selection of resistance values for resistors 506-512 in accordance with equations (7) and (8) is also effective to match the resistive portion of the characteristic impedance of transmission line, 108.

In accordance with the operation of transmitter 500, signal NRZ-D1 is encoded and precharged within a single circuit for transmission on transmission line 108. Also, the precharging is effected without the use of energy storing elements, so that the above-noted problems of signal Overshoot and consequent data errors is obviated. Further, the precharge is selectively added to the encoded signal, unlike the practice in the prior art wherein equalization circuitry adds precharge to the entire signal being transmitted.

The preferred use of transceivers as illustrated in FIG. 1 is not essential, even to the two-way communication aspects of the invention, as it is readily seen that the somewhat different transmitters of FIGS. 2 and 5 in principle can be used with essentially identical receivers.

Moreover, for one-way communication, of which radio and television broadcasting are examples, isolated transmitters and receivers can readily be provided and used according to the invention.

While embodiments of transmitter circuit 200 and receiver circuit 400 have been described enabling their construction with discrete circuit components, the invention is not so limited. Each of circuits 200 and 400 are configured with compatible ECL circuitry that readily enables substantial portions of their circuitry to be integrated in a common substrate. However, the implementations of circuits 200 and 400 are not limited to ECL circuitry and the manner of their implementations in other circuitry will now occur to those skilled in the art.

Thus in accordance with the present invention, there are provided embodiments of transmitter and receiver circuits that have relatively few circuit components, that can be configured relatively inexpensively, and that are to a great extent integratable.

Although transmitter circuit 200 has been described herein as including line equalizer circuit 282, such equalization circuitry can instead be located in receiver circuit 400. Also, transmitter circuit 200 is described as including XOR gate 252 to delay the signal $V_X$. However, as will now be apparent to those skilled in the art, the delay of signal $V_X$ can also be effected by provision of other delay circuitry, such as a resistor-inductor-capacitor networks.

While the transceiver circuit of the present invention has been illustrated and described for transmitting and receiving high data-rate data signals, it of course can be used for transmitting and receiving data signals having lower data rates.

While embodiments of the present invention have been illustrated and described for transmitting and receiving data on wire pairs or other two-conductor transmission lines, the present invention is readily applicable to transmitting and receiving data on other forms of transmission paths such as radio propagation paths or paths in a guided transmission medium, such as paths in an integrated or optical circuit.

The foregoing description of the preferred embodiments and the examples of the invention have been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A digital data transmitter, comprising:
   means for generating from a binary data signal first and second two-level signals representative of a modified-duo-binary-encoded form of said binary data signal;
   a transformer with a two-terminal primary winding to generate a 3-level modified-duobinary-encoded signal proportional to the difference between said two-level signals;
   means for coupling said two-level signals to said primary winding of said transformer; and
   transmission equalizer means for compensating for attenuation effects of a transmission line to be connected to said transmitter.

2. A transmitter for transmitting digital data, comprising:
   means for encoding a binary data signal, said encoding means including
   means for retiming the binary data signal with a clock signal to provide a synchronized data signal,
   first logic means for exclusive-ORing the synchronized data signal with a delayed logic signal to provide a first logic output signal,
   first delaying means, responsive to the clock signal, for delaying the first logic output signal by two clock periods of the clock signal to provide the delayed logic signal,
   second logic means for exclusive-ORing the synchronized data signal with the delayed logic signal to provide a first two-level driving signal, and
   second delaying means for delaying the delayed data signal to provide a second two-level driving signal synchronized with the first driving signal; and
   means for transmitting the first and second driving signals.

3. The transmitter of claim 2 wherein said second delaying means comprises an exclusive-OR gate having a first input connected to receive the delayed logic signal and its remaining inputs disconnected, and an output for providing the second driving signal.

4. The transmitter of claim 2 wherein said first delaying means comprises:
   a first flip-flop circuit having a data input coupled to receive the first logic output signal, and a data output;
   a second flip-flop circuit having a data input coupled to the data output of said first flip-flop circuit and a data output for providing the delayed logic signal; and
   clock inputs of said first and second flip-flop circuits coupled to receive the clock signal.

5. The transmitter of claim 2 including a transformer having a primary winding and a secondary winding, the secondary winding for coupling to the transmission line, and the primary winding having first and second terminals respectively coupled to receive the first and second driving signals.

6. A transmitter for transmitting digital data, comprising
   programmable logic to provide a modified duobinary encoded data signal from a binary data signal, said programmable logic including precharging means for generating a precharging signal; and
   conditioning means including means for combining the encoded data signal and the precharging signal.

7. The transmitter of claim 6 wherein the conditioning means includes:
   means, operatively coupled to receive the encoded data signal, for generating first and second two-level driving signals; and
   a transformer having a primary winding and a secondary winding, the secondary winding for coupling to a transmission line, and the primary winding having first and second terminals respectively coupled to receive the first and second driving signals.

8. A transmitter for transmitting digital data, comprising:
   programmable logic to provide a modified duobinary encoded data signal from a binary data signal, said programmable logic including precharging means for generating a precharging signal; and
   conditioning means including means for providing a resultant signal including the encoded data signal and the precharging signal.

9. The transmitter of claim 8 wherein the encoded data signal includes first and second data signals, the precharging signal includes first and second precharging signals, and the resultant signal includes first and second resultant signals;
   said means for providing a resultant signal including:
   first load means, coupled to receive the first data signal and the first precharging signal, for providing the first resultant signal; and
   second load means, coupled to receive the second data signal and the second precharging signal, for providing the second resultant signal.

10. A receiver for receiving a three-level encoded data signal, said receiver comprising:
    means for generating a minimum threshold voltage and a bias voltage, the minimum threshold voltage being greater than the bias voltage;
    phase splitting means, operatively coupled to receive the bias voltage, for splitting the encoded signal into first and second complementary three-level signals each having a middle voltage level equal to the bias voltage;
    means, operatively coupled to receive the first and second complementary three-level signals and the minimum threshold voltage, for generating a first threshold voltage that is equal to or greater than the minimum threshold voltage according to a peak level of the first and second complementary three-level signals; ad
    signal detection means, operatively coupled to receive the first and second complementary three-level signals and the first threshold voltage, for detecting logic levels in said first and second complementary three-level signals relative to the first threshold voltage, and for forming a serial binary signal having the detected logic levels.

11. The receiver of claim 10 wherein said means for generating a minimum threshold voltage and a bias voltage includes means for compensating for the effect of ambient temperature on the generation of the minimum and bias voltages.

12. The receiver of claim 10, wherein said means for generating a minimum threshold voltage and a bias voltage includes:
    means for generating a first voltage and a second voltage less than the first voltage; and
    voltage divider means, coupled to receive the first and second voltages, for providing the minimum threshold voltage and the bias voltage.

13. The receiver of claim 12 wherein said voltage divider means includes first, second and third resistors connected in series, the second resistor being connected between the first and third resistors, an end of the first resistor remote from the second resistor being connected to receive the first voltage, an end of the third resistor remote from the second resistor being connected to receive the second voltage;
    a first terminal node between said first and second resistors at which the minimum threshold voltage is provided;
    a second terminal node between said second and third resistors at which the bias voltage is provided.

14. The receiver of claim 10 wherein said means for generating a first threshold voltage includes peak signal means for generating a peak signal representative of the peak level of the first and second complementary three-level signals.

15. The receiver of claim 14 wherein said peak signal means includes voltage divider means, coupled to receive the first and second three-level signals, for providing the peak signal as a predetermined percentage of the difference between the first and second complementary three-level signals.

16. A transceiver for transmitting and receiving digital data on first and second transmission paths, respectively, said transceiver comprising:
    transmitter means for transmitting a serial binary data signal to a remote receiver via the first transmission path, said transmitter means including means for encoding the serial binary signal as a first three-level modified duobinary encoded signal and means for providing a two-level driving signal for driving the first transmission path with the first three-level modified duobinary encoded signal; and
    receiver means for receiving a second three-level modified duobinary encoded signal from a remote transmitter via the second transmission path, said receiver means including
    means for generating a minimum threshold voltage and a bias voltage, the minimum threshold voltage being greater than the bias voltage;
    phase splitting means, operatively coupled to receive the bias voltage, for splitting the second modified duobinary signal into first and second complementary three-level signals each having a middle voltage level equal to the bias voltage;
    means, operatively coupled to receive the first and second complementary three-level signals and the minimum threshold voltage, for generating a first threshold voltage that is equal to or greater than the minimum threshold voltage according to a peak level of the first and second complementary three-level signals; and
    signal detection means, operatively coupled to receive the first and second complementary three-level signals and the first threshold voltage, for detecting logic levels in said first and second complementary three-level signals relative to the first threshold voltage, and for forming a serial binary signal having the detected logic levels.

17. The transceiver of claim 16 wherein said encoding means comprises:
    programmable array logic means for providing a first control signal representative of the first modified duobinary encoded signal; ad
    said means for providing a two-level driving signal being responsive to the first control signal to drive the first transmission path with the driving signal.

18. The transceiver of claim 17 wherein the programmable array logic means includes precharging means for generating a second control signal representative of an amount of precharging to be added to said driving signal, and wherein the means for providing a two-level driving signal is responsive to the second control signal to drive the first transmission path with the driving signal including the added amount of precharging.

19. The transceiver of claim 16 wherein the first transmission path is a first two-wire transmission line;
said transmitter means further including a transformer having a primary winding and a secondary winding, the secondary winding for coupling to the first transmission line, and the primary winding having first and second terminals connected to receive the two-level line driving signals; and
said encoding means including line driving means for generating said two-level line driving signal as first and second two-level line driving signals respectively applied to the first and second terminals of the primary winding;
so that said transformer is driven with the first and second two-level signals to drive the first transmission line with the first three-level modified duobinary signal.

20. The transceiver of claim 19 wherein said line driving means includes means, coupled between said line driving means and said transformer, for reducing electromagnetic emissions on the first transmission line.

21. The transceiver of claim 20 wherein said line driving means includes means for generating the first two-level driving signal and means for generating the second two-level driving signal; and
said emissions reducing means including:
a first receptor coupled between the first drive signal generating means and the first terminal of the transformer primary winding; and
a second resistor coupled between the second drive signal generating means and the second terminal of the transformer primary winding.

22. The transceiver of claim 19, said transmitter means further including line equalizer means for compensating for attenuating effects of the first transmission line.

23. The transceiver of claim 19 wherein said line driving means includes means for generating said first and second driving signals in synchronism.

24. The transceiver of claim 26 wherein said means for generating a minimum threshold voltage and a bias voltage includes means for compensating for the effect of ambient temperature on the generation of the minimum threshold voltage and the bias voltage.

25. The transceiver of claim 16, wherein said means for generating a minimum threshold voltage and a bias voltage includes:
means for generating a first voltage and a second voltage less than the first voltage; and
voltage divider means, coupled to receive the first and second voltages, for providing the minimum threshold voltage and the bias voltage.

26. The transceiver of claim 25 wherein said voltage divider means includes:
first, second and third resistors connected in series, the second resistor being connected between the first and third resistors, an end of the first resistor remote from the second resistor being connected to receive the first voltage, an end of the third resistor remote from the second resistor being connected to receive the second voltage;
a first terminal node between said first and second resistors at which the minimum threshold voltage is provided; and
a second terminal node between said second and third resistors at which the bias voltage is provided.

27. The transceiver of claim 16 wherein said means or generating a first threshold voltage includes peak signal means for generating a peak signal representative of the peak level of the first and second complementary three-level signals.

28. The transceiver of claim 27, wherein said peak signal means includes voltage divider means, coupled to receive the first and second three-level signals, for providing the peak signal as a predetermined percentage of the difference between the first and second complementary three-level signals.

29. A method for transmitting and receiving digital data, comprising the steps of:
encoding a serial binary data signal as a three-level modified duobinary encoded signal for transmission;
transmitting the encoded modified duobinary signal on a transmission path;
receiving the encoded modified duobinary signal;
generating a minimum threshold voltage and a bias voltage, the minimum threshold voltage being greater than the bias voltage;
splitting the received signal into first and second complementary three-level signals each having a middle voltage level equal to the bias voltage;
generating a first threshold voltage that is equal to or greater than the minimum threshold voltage according to a peak level of the first and second complementary three-level signals;
detecting logic levels in the first and second complementary three-level signals; and
forming a serial binary signal having the detected logic levels.

30. The method of claim 29, wherein the encoding step includes generating first and second two-level driving signals representative of the modified duobinary encoded signal.

31. The method of claim 30, wherein the encoding step includes performing programmed logic array encoding of the serial binary signal.

32. The method of claim 31, further including the step of performing programmed logic array precharging of the driving signals to compensate for transmission attenuation.

33. The method of claim 29, wherein the step of generating a minimum threshold voltage and a bias voltage includes generating the minimum threshold voltage and the bias voltage both compensated for the effect of ambient temperature.

34. The method of claim 29, wherein the step of generating a first threshold voltage includes the step of generating a peak signal representative of the peak level of the first and second three-level signals.

35. The method of claim 29 wherein the encoding step comprises the substeps of:
retiming the binary data signal with a clock signal to provide a synchronized data signal;
exclusive-ORing the synchronized data signal with a delayed logic signal to provide a first logic output signal;
delaying the first logic output signal by two clock periods of the clock signal to provide the delayed logic signal;
exclusive-ORing the synchronized data signal with the delayed logic signal to provide a first two-level driving signal; and delaying the delayed data signal to provide a second two-level driving signal synchronized with the first driving signal.

36. A system for transmitting and receiving digital data, comprising:
   means for encoding a serial binary data signal as a three-level modified duobinary encoded signal;
   means for transmitting the encoded modified duobinary signal on a transmission path;
   means for receiving the encoded modified duobinary signal;
   means for generating a minimum threshold voltage and a bias voltage, the minimum threshold voltage being greater than the bias voltage;
   means, operatively coupled to receive the bias voltage, for splitting the received signal into first and second complementary three-level signals each having a middle voltage level equal to the bias voltage;
   means for generating a first threshold voltage that is equal to or greater than the minimum threshold voltage according to a peak level of the first and second complementary three-level signals;
   means, operatively coupled to receive the first and second complementary three-level signals and the first threshold voltage, for detecting logic levels in the first and second complementary three-level signals; and
   means for forming a serial binary signal having the detected logic levels.

37. The system of claim 31, wherein said encoding means includes means for generating first and second two-level driving signals representative of the modified duobinary encoded signal.

38. The system of claim 37, wherein said encoding means includes means for performing programmed logic array encoding of the serial binary signal.

39. The system of claim 38, further including means for performing programmed logic array precharging of the driving signals to compensate for transmission attenuation.

40. The system of claim 36, wherein the means for generating a minimum threshold voltage and a bias voltage includes means for generating the minimum threshold voltage and the bias voltage both compensated for the effect of ambient temperature.

41. The system of claim 36 wherein the means for generating a first threshold voltage includes means for generating a peak signal representative of the peak level of the first and second complementary three-level signals.

42. A digital data transmitter, comprising:
   means for generating from a binary data signal first and second two-level signals representative of a modified-duo-binary-encoded form of said binary data signal;
   a transformer with a two-terminal primary winding to generate a 3-level modified-duobinary-encoded signal proportional to the difference between said two-level signals; ad
   means for coupling said two-level signals to said primary winding of said transformer.

43. A digital data transmitter, comprising:
   means for generating from a binary data signal first and second two-level signals representative of a modified-duo-binary-encoded form of said binary data signal;
   a transformer with a two-terminal primary winding to generate a 3-level modified-duobinary-encoded signal proportional to the difference between said two-level signals; and
   means for coupling said two-level signals to said primary winding of said transformer in a manner effective to reduce electromagnetic emissions on a transmission line to be connected to said transformer.

44. The transmitter of claim 43 wherein said reducing means comprises two series resistors.

* * * * *